United States Patent
Arai

(10) Patent No.: US 6,714,920 B1
(45) Date of Patent: Mar. 30, 2004

(54) INFORMATION PROCESSING APPARATUS AND INFORMATION PROCESSING METHOD

(75) Inventor: Toshiyuki Arai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/297,448

(22) PCT Filed: Sep. 2, 1998

(86) PCT No.: PCT/JP99/03928

§ 371 (c)(1),
(2), (4) Date: Oct. 4, 1999

(87) PCT Pub. No.: WO99/13416

PCT Pub. Date: Mar. 18, 1999

(30) Foreign Application Priority Data

Sep. 5, 1997 (JP) ............................................. 9/240787

(51) Int. Cl.$^7$ ............................................. G06F 17/60
(52) U.S. Cl. ........................... 705/52; 705/27; 709/217; 709/219; 707/10
(58) Field of Search ............................. 705/51, 52, 57, 705/14, 27; 709/217, 219; 707/3, 9, 10

(56) References Cited

U.S. PATENT DOCUMENTS

| | | | | |
|---|---|---|---|---|
| 5,418,713 A | * | 5/1995 | Allen | 705/32 |
| 5,541,638 A | * | 7/1996 | Story | 725/116 |
| 5,557,541 A | * | 9/1996 | Schulhof et al. | 700/94 |
| 5,619,570 A | * | 4/1997 | Tsutsui | 705/52 |
| 5,636,139 A | * | 6/1997 | McLaughlin et al. | 709/219 |
| 5,636,276 A | * | 6/1997 | Brugger | 705/52 |
| 5,675,734 A | * | 10/1997 | Hair | 705/52 |
| 5,717,923 A | * | 2/1998 | Dedrick | 705/52 |
| 5,721,827 A | * | 2/1998 | Logan et al. | 709/217 |
| 5,734,719 A | * | 3/1998 | Tsevdos et al. | 705/51 |
| 5,914,941 A | * | 6/1999 | Janky | 709/219 |
| 5,918,213 A | * | 6/1999 | Bernard et al. | 705/26 |
| 5,931,901 A | * | 8/1999 | Wolfe et al. | 705/26 |
| 5,963,916 A | | 10/1999 | Kaplan | 705/26 |
| 5,970,231 A | | 10/1999 | Crandall | 709/217 |
| 6,065,042 A | | 5/2000 | Reimer et al. | 709/203 |
| 6,209,096 B1 | | 3/2001 | Taruguchi | 705/57 |
| 6,300,880 B1 | | 10/2001 | Sitnik | 705/10 |

FOREIGN PATENT DOCUMENTS

| | | |
|---|---|---|
| EP | 0390611 | 10/1990 |
| JP | 63299453 | 12/1988 |
| JP | 2136971 | 5/1990 |
| JP | 0411288 | 1/1992 |
| JP | 0426899 | 7/1992 |
| JP | 4291057 | 10/1992 |
| JP | 7203420 | 8/1995 |
| JP | 7297952 | 11/1995 |
| JP | 9114755 | 5/1997 |
| JP | 9152882 | 6/1997 |
| JP | 9160922 | 6/1997 |
| WO | WO 90/02382 | * 3/1990 |

OTHER PUBLICATIONS

Ensor, Pat, "Book Reviews—Finding It on the Internet: The Essential Guide to Archie, Gopher, Veronica, WAIS, WWW, and Other Search and Browsing Tools", Information Technology & Libraries, vol. 14, No. 1, pp. 55–56, Mar. 1995.*

Anonymous, Datware Announces BRS-Based Product—BRS/Search for Windows NT, Computergram International, Jun. 24, 1994.*

* cited by examiner

Primary Examiner—John W. Hayes
(74) Attorney, Agent, or Firm—Jay H. Maioli

(57) ABSTRACT

An efficient as well as rational information distribution system where retrieval can be carried out based on various kinds of retrieval information related to download information and particularly, at a time when the download information is specified from the retrieval information, if the retrieval information is outputted to a user as an advertisement, the amount of money to be billed for the download information is reduced by what the advertisement is worth.

27 Claims, 10 Drawing Sheets

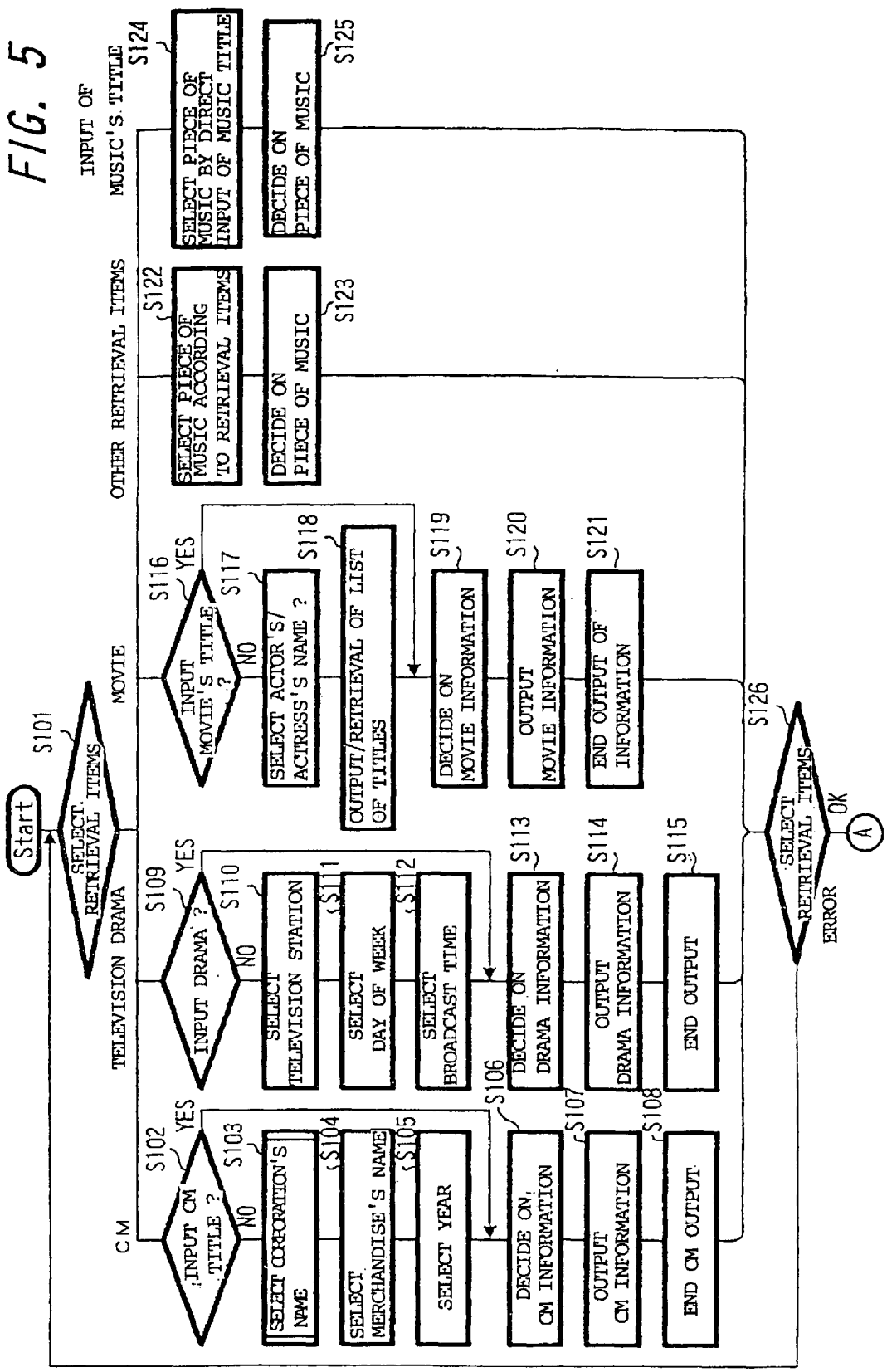

INFORMATION PROCESSING APPARATUS AND INFORMATION PROCESSING METHOD

TECHNICAL FIELD

The present invention relates to an information distribution system which, for example, distributes information from an information storage apparatus in which information is accumulated to an information transmitting apparatus and further, by outputting the information received by the information transmitting apparatus, makes it possible for a terminal apparatus to copy the information; an information processing apparatus provided in such an information distribution system for carrying out a predetermined process; and an information processing method.

BACKGROUND ART

Previously, an information distribution system has been proposed by the present applicant, such that, for example, a plurality of musical pieces data (audio data), video data and the like are stored in a server as a data base and at the same time, out of these plurality of information, necessary data is distributed among a plurality of intermediate server apparatus and out of the intermediate server apparatus, designated information can be down-loaded to a portable terminal apparatus personally owned by a user.

For example, in the above-mentioned information distribution system, when a thought is given to a case where a user having a portable terminal apparatus carries out a retrieval to down-load a desired piece of music from the server apparatus or the intermediate server apparatus, the user needs to input information to specify the piece of music such as the name of the piece of music, the name of a player and the like out of the data on the piece of music to be downloaded.

However, it does not always happen that the user knows about the name of the piece of music and the like to be downloaded. For example, in an environment where the user leads an ordinary life, on many occasions, the user takes notice of some pieces of music as when he listens to the pieces of music used as commercials broadcast by a radio and a television and when he listens to some pieces of music inserted in television dramas, movies and so on. In these circumstances, it naturally happens that the user, although he remembers the names of the merchandise of the commercials, the sponsor's names, the titles of the dramas, the movies and the like, does not accurately recalls information such as the names of the commercials used therein, the player's names and the like or does not entirely knows about them.

Here, if the information distribution system does not adopt a retrieval system which can carry out a retrieval based on only information directly concerning the piece of music such as the name of the piece of music, a player's name and the like, when the user does not have accurate knowledge of the name of the piece of music and the player's name of the piece of music he wants to download, a retrieval can not effectively be carried out.

THE DISCLOSURE OF THE INVENTION

Therefore, an object of the present invention is, even when a user does not accurately know about the information to be able to directly specify the name of the piece of music, the player's name and the like, to make it possible to carry out an efficient retrieval of the name of the piece of music the user wants to download based on other retrieval items.

Meanwhile, the information and other various kinds of services the user downloads are billed by the information processing apparatus and for example, when the above-mentioned other retrieval items can have something to do with setting of the billing, it is desirable to be able to obtain a more rational system in for use with the information processing apparatus by taking this into consideration.

For this, there is provided an arrangement of an information processing method in which after main information is stored in a first memory area, and information which has the contents related to each of the main information and is capable of being used as a retrievable item for retrieving the main information is stored in a second memory area as sub-information, the information processing method including: a sub-information selecting process for selecting the sub-information according to a predetermined operation; a main information retrieving process for retrieving the main information corresponding to the sub-information selected by the sub-information selecting process; a sub-information outputting process for reading out and outputting the sub-information selected by the sub-information selecting process from the second memory area; a main information outputting process for reading out and outputting the main information retrieved by the main information retrieving process from the first memory area; and a billing process which carries out the billing of the main information outputted by the main information outputting process and when an output by the sub-information outputting process is executed with respect to the sub-information on the main information which is an object of the billing, reduces the amount of money to be billed.

Also, there is provided an information processing apparatus, comprising: a main information memorizing means for storing the main information; a sub-information memorizing means for storing information of predetermined content which has the contents concerning each of the main information as well as capable of being used as retrieval items for retrieving the main information as a sub-information; a sub-information selecting means for selecting the sub-information according to a predetermined operation; a main information retrieving means for retrieving the main information corresponding to the sub-information selected by the sub-information selecting means; a sub-information outputting means for reading out and outputting the sub-information selected by the sub-information selecting means from the sub-information memorizing means; a main information outputting means for reading out and outputting the main information retrieved by the main information retrieving means from the main information memorizing means; and a billing means which carries out the billing of the main information outputted by the main information outputting process and reduces the amount of money to be billed when an output by the sub-information outputting process is executed with respect to the sub-information on the main information which is an object of the billing.

Also, there is provided an arrangement of an information processing device, comprising: an information storing apparatus which is constituted such that information in terms of units according to predetermined contents is stored therein and as an information outputting operation, required information can be outputted out of at least the stored information; an information transmitting apparatus which, by being made capable of carrying out communication with the information storing device, is made capable of a receiving operation for receiving information outputted by the information storing device as well as is made of capable of transmitting outside through an output of the information at least obtained by the receiving operation as an information outputting operation; and a terminal apparatus which is made capable of downloading at least information transmitted by an output from the information transmitting apparatus by being made capable of communicating with the information transmitting apparatus. An information processing system is provided in the information processing apparatus, including: a main information memorizing means for storing the main information; a sub-information memorizing means which has contents concerning each of the main information as well as stores, as the sub-information, information capable of being used as a retrieval item for retrieving the main information; a sub-information selecting means for selecting the sub-information by way of a predetermined operation; a main information retrieving means for retrieving the main information corresponding to the sub-information selected by the sub-information; a sub-information outputting means for reading out and outputting the sub-information selected by the sub-information selecting means from the sub-information memorizing means; a main information outputting means for reading out and outputting the main information retrieved by the main information retrieving means from the main information memorizing means; and a billing means which carries out the billing of the main information outputted by the main information outputting means and reduces the amount of money to be billed when an output by the sub-information outputting means is executed with respect to the sub-information on the main information which is an object of the billing.

According to the above-mentioned arrangement, for example, at a time of downloading the main information, by presenting the sub-information as a retrieval item, it becomes possible to specify and select information to be desirably downloaded based on the sub-information.

Then, for example, at a time when the download information is selected by the sub-information, if sub-information is outputted and presented in predetermined forms to a user by preparing sub-information having advertising elements, it is possible to set billing such as reducing an amount of money commensurate with advertising rates from an amount of money for downloading.

BRIEF DESCRIPTION OF THE DRAWINGS

FIG. 5 is a flowchart for realizing operations at a time of downloading information on a piece of music.

BEST MODE FOR CARRYING OUT THE PRESENT INVENTION

Hereafter, one embodiment of the present invention will be explained with reference to FIG. 1 through FIG. 10.

Meanwhile, the following explanation will be carried out in the following order.

[1. Example of an arrangement of the information distribution system]
 (1-a. A summary of the information distribution system)
 (1-b. Internal arrangements of respective apparatuses constituting the information distribution system)
[2. Downloading of information in the embodiment]
 (2-a. The data structure of respective information)
 (2-b. Selecting manipulation and a processing operation for downloading the information)
 (2-c. An example of usage forms of the download information)
[1. An example of an arrangement of the information distribution system]
 (1-a. A summary of the information distribution system)

Figure 1:
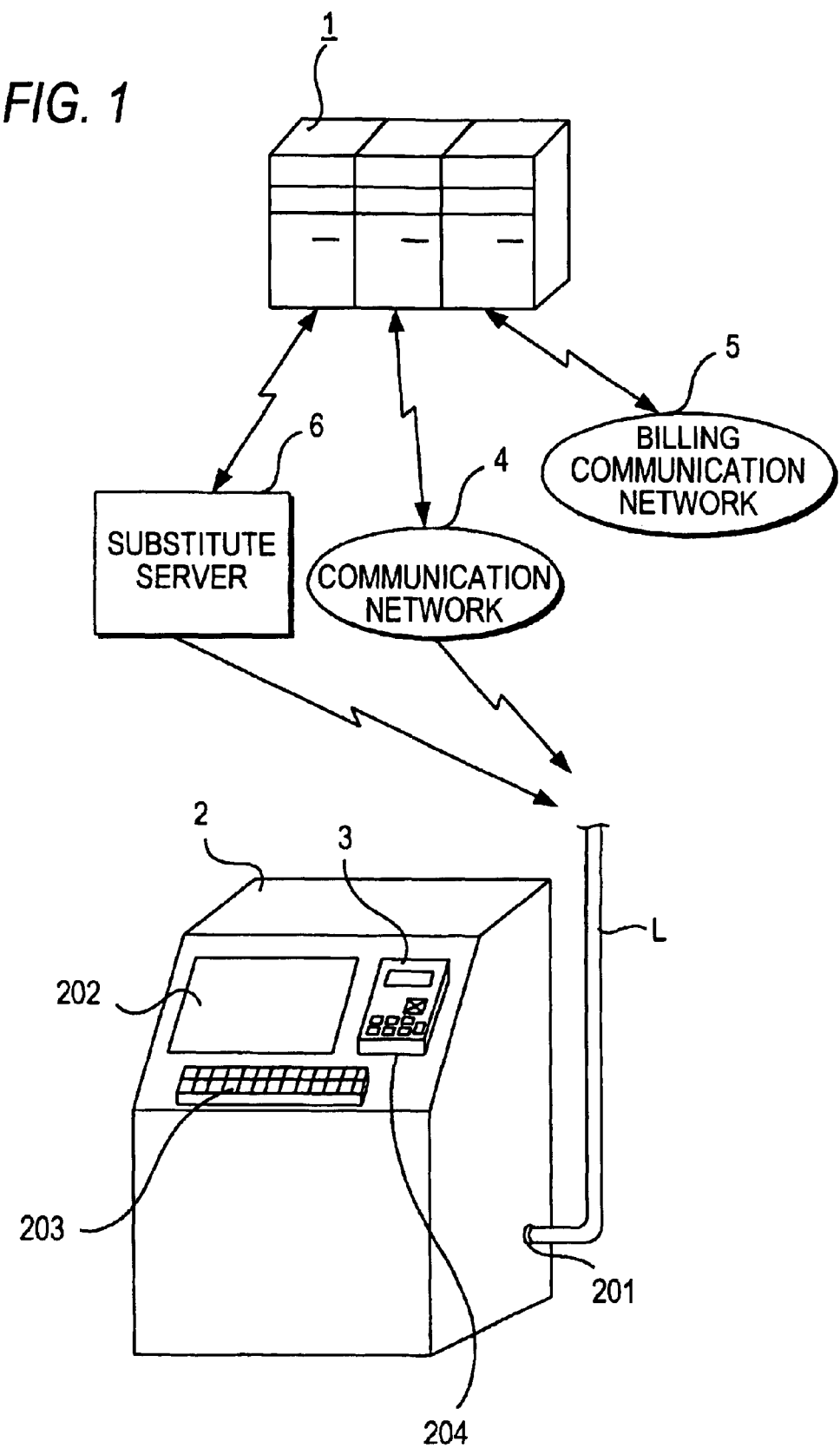
FIG. 1 is an explanatory diagram conceptually showing an example of an arrangement of an information distribution system as an embodiment of the present invention.
Figure 2:
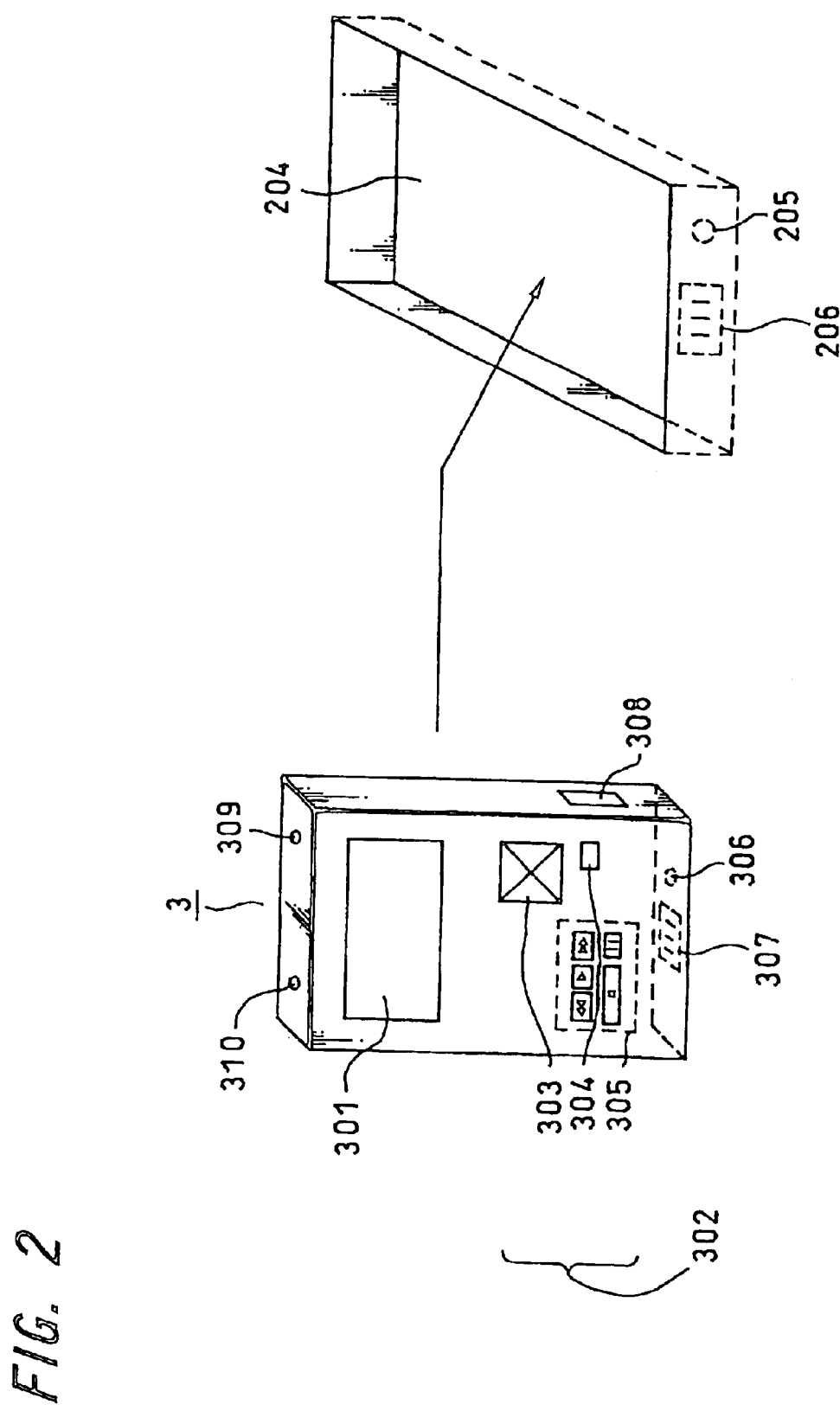
FIG. 2 is a perspective view showing an example of an appearance of a portable terminal as well as a terminal fitting unit of an intermediate transmission apparatus.

First of all, with reference to FIG. 1 and perspective view of FIG. 2, an arrangement of the information distribution system concerning the embodiment of the present invention will be explained. FIG. 1 shows an outline of the information distribution system of the embodiment. FIG. 2 shows a terminal fitting unit 204 in an intermediate transmitting apparatus 2 of a portable terminal apparatus 3 out of apparatuses constituting the information distribution system.

In FIG. 1, a server apparatus 1 is provided with a memory medium with a large memory capacity storing required information beginning with data for distribution to be explained later (for example, audio information, text information, image information, video information and the like) and can carry out mutual communications with a plurality of intermediate transmitting apparatuses 2 at least through a communication network 4. For example, the server apparatus 1 receives demand information transmitted from the intermediate transmitting apparatus 2 through the communication network 4 and retrieves information designated by the demand information from information memorized in a recording medium.

Meanwhile, the above-mentioned demand information is generated by a user of the portable terminal apparatus 3 to be explained later who carries out manipulation for requesting desired information by using the portable terminal apparatus 3 or the intermediate transmitting apparatus 2. The information obtained by retrieval is transmitted to the intermediate transmitting apparatus 2 through the communication network 4.

Also, according to the embodiment, information uploaded, which will be explained later, from the server 1 through the intermediate transmitting apparatus 2 is downloaded by the portable terminal apparatus 3 and when the portable terminal apparatus 3 is charged by using the intermediate transmitting apparatus 2, billing of the user is carried out. A billing communication network 5 for collecting rates from the user according to the billing process is provided. The billing communication network 5 is connected to, for example, financial institutions or the like with which respective users sign a contract to pay the rates for using the information distribution system.

The intermediate transmitting apparatuses 2 are installed, in stores of respective stations, in the convenience stores, public telephone booths, respective households and the like and have a function of having a communication control terminal 201 receive the information transmitted mainly from the server 1 through the communication network 4 and output the received information to the portable terminal apparatus 3.

On a front panel of the intermediate transmitting apparatus 2 are provided a terminal fitting unit 204 for fitting, for example, the portable terminal apparatus 3, a displaying unit 202 for properly displaying required contents, a key manipulating unit 203 for carrying out the selection of the information a user desires or other required manipulations and the like.

Also, a communication control terminal 201 provided on a side surface portion of the main body is a control terminal for carrying out interactive communications with the server apparatus 1 through the server apparatus 1 and the communication network 4 and FIG. 1, a state in which a communication circuit or a network cable L is pulled out is shown.

Also, in the terminal fitting unit 204 are provided, as FIG. 2 shows, an information input/output terminal 205 and a power supplying terminal 206. Under the state that the portable terminal apparatus 3 is fitted in the terminal fitting unit 204, the information input/output terminal 205 is connected to an information input/output terminal 306 of the portable terminal apparatus 3 and the power supplying terminal 206 is connected to a power input terminal 307.

The portable terminal apparatus 3 is provided with, as FIG. 2 shows, a display unit 301 and a key manipulating unit 302 on the front portion of the main body.

A display is provided on the displaying unit 301 in response to, for example, the manipulation and operation a user has conducted to the key manipulating unit 302. The key manipulating unit 302, provides a select key 303 for selecting information for requesting, a decision key 304 for verifying the selected requesting information, an operation key 305 and the like. The portable terminal apparatus 3 concerning the embodiment is capable of reproducing the information memorized in an internal recording medium but the operation key 305 is provided for carrying out various kinds of reproduction operations for the information memorized in the recording medium of the portable terminal apparatus 3.

Also, on the bottom portion of the portable terminal apparatus 3 are provided the information output/input terminal 306 and the power input terminal 307. As mentioned before, with the portable terminal apparatus 3 being fitted in the terminal fitting unit 204 of the intermediate transmitting apparatus 2, the information output/input terminal 306 and the power input terminal 307 are respectively connected to the information output/input terminal 205 and the power supplying terminal 206 of the intermediate transmitting apparatus 2. With the information input/output terminal 306 of the portable terminal apparatus 3 being connected to the information input/output terminal 205 of the intermediate transmitting apparatus 2, output and input of information can be carried out between the portable terminal apparatus 3 and the intermediate transmitting apparatus 2. The information supplied to the portable terminal apparatus 3 from the intermediate transmitting apparatus 2 can be memorized, that is, downloaded to a predetermined kind of recording medium built in the portable terminal apparatus 3. With the power input terminal 307 of the portable terminal apparatus 3 being connected to the information input/output terminal 205 of the intermediate transmitting apparatus 2, power supply (and charge) to the portable terminal apparatus 3 can be carried out by using a power circuit in the intermediate transmitting apparatus 2.

Also, on the upper surface portion of the portable terminal apparatus 3 are provided an audio output terminal 309 and a microphone terminal 310 and on the side surface portion thereof is provided a connector 308 to which an outer display device, a key-board, a modem, or a terminal adaptor and the like are connected. The connector 308 will be explained later.

In this manner, the information distribution system concerning the embodiment is a system to realize so-called data on demand in which the information requested by a user with the portable terminal apparatus 3 out of a plurality of information memorized in the server apparatus 1 can be memorized in the recording medium of the portable terminal apparatus 3.

Meanwhile, there is nothing wrong with the ways that the displaying unit 202 and the key manipulating unit 203 are provided and further on the intermediate transmitting apparatus 2, the function taken charge by the intermediate transmitting apparatus 2 is reduced and instead, the manipulation provided in the intermediate transmitting apparatus 2 can be carried out by the displaying unit 301 and the key manipulating unit 302 of the terminal apparatus 3.

Also, in FIG. 2 (and FIG. 1), an arrangement is adopted, in which the main body portion of the portable terminal apparatus 3 is removably fit in the intermediate transmitting apparatus 2, but as an input/output of the information and a power input have only to be carried out with at least the intermediate transmitting apparatus 2 side, an arrangement is also recommended in which a power supplying line and information input/output line having respectively mini-size fitting units are derived from a bottom surface, a side surface, or positions such as a tip end portion and the like of the portable terminal apparatus 3 so that the mini-size fitting units are connected to the intermediate transmitting apparatus 2.

Also recommendable is an arrangement in which a plurality of the portable terminal apparatuses 3 are fit or connected to one intermediate transmitting apparatus 2 because it is conceivable that a plurality of users try to access the one intermediate transmitting apparatus 2 from the respective portable terminal apparatuses 3.

Also, as the communication network 4, there are no particular restrictions, and for example, it is possible to use ISDN (Integrated Services Digital Network), CATV (Cable Television, Community Antenna Television), a communication satellite, wireless communication, a telephone line and the like.

Also, as the communication network 4, it needs to be able to carry out a bidirectional communication in order to perform the data on demand. For example, when an existing communication satellite and the like are used as the communication network 4, the communication through the satellite becomes the one-way only communication like that from a base station to a terminal station and hence, there is nothing wrong with the way that more than 2 kinds of networks are used such as using other communication networks or communication circuits in order to carry out communication from the terminal station to the base station.

Also, there is a possibility that not only it costs an enormous amount of money to improve an infrastructure such as connecting between the server apparatus 1 and all the intermediate transmitting apparatuses 2 in order to directly transmit information from the server apparatus 1 to the intermediate transmitting apparatus 2 through the communication network 4 and the like, but also demand information tends to concentrate on one server apparatus 1, thereby inflicting a load on the server apparatus 1. In order to solve this problem, it is recommended that a proxy server 6 to temporarily memorize data reciprocated between the server apparatus 1 and the intermediate transmitting apparatus 2 is provided between the server apparatus 1 and the intermediate transmitting apparatus 2 to try to economize on the length of a circuit between the server apparatus 1 and the intermediate transmitting apparatus 2 and at the same time, the proxy server 6 is beforehand downloaded with data with high frequency in use and the latest data from the server apparatus 1, thereby making it possible to download the information according to demand information from the portable terminal apparatus 3 to the portable terminal apparatus 3 or the intermediate transmitting apparatus 2 only by data communication between the proxy server 6 and the intermediate transmitting apparatus 2.

(1-b. Internal arrangements of respective apparatuses constituting the information distribution system)

Next, with reference to the block diagram in FIG. 3, arrangements of respective apparatuses (the server apparatus 1, the intermediate transmitting apparatus 2, and the portable terminal apparatus 3) constituting the information distribution system concerning the embodiment will be explained. Meanwhile, the same marks are attached to the same portions in FIG. 1 and FIG. 2.

First of all, the server apparatus 1 will be explained.

Figure 3:
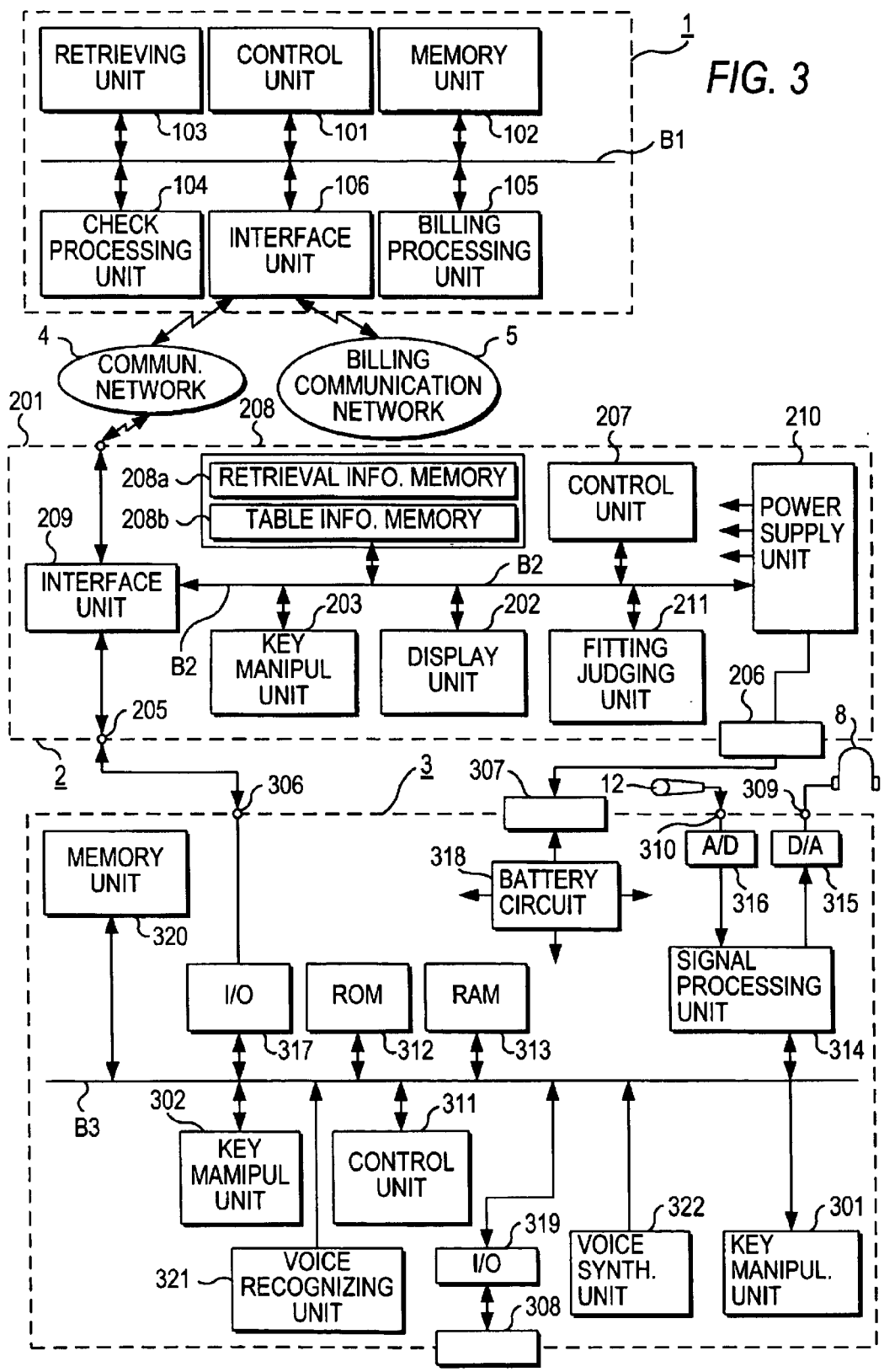
FIG. 3 is a block diagram showing an internal arrangement of respective devices forming the information distribution system of the embodiment.

The server apparatus 1 as shown in FIG. 3 is provided with a control unit 101, a memorizing unit 102, a retrieving unit 103, a check processing unit 104, a billing processing unit 105 and an interface unit 106. These respective units are connected to be able to mutually carry out transmission and receipt of data through a bus line B1.

The control unit 101 is formed of, for example, a microcomputer and the like and carries out the control of respective units in the server apparatus 1 in response to various kinds of information supplied through the interface unit 106 from the communication network 4.

The interface unit 106 carries out interactive communications with the intermediate transmitting apparatus 2 through the communication network 4 (graphical showing of the server apparatus 1 is omitted in the diagram). Meanwhile, concerning a transmission protocol when the transmission is carried out, either an original protocol or protocols in which data is packet-transmitted by the TCP/IP (Transmission Control Protocol/Internet Protocol) and the like generally used on the Internet are recommended.

The retrieving unit 103 carries out a process for retrieving required data from a plurality of data memorized in the memorizing unit 102 based on control data or a control signal of the control unit 101. For example, the retrieving process by the retrieving unit 103 is carried out based on demand information transmitted from, for example, the intermediate transmitting apparatus 2 and inputted in the control unit 101 from the communication network 4 through the interface unit 106.

The memorizing unit 102 is provided with, for example, a recording medium having a large memory capacity, a driver device for driving the recording medium and the like. In the memorizing unit 102 is memorized information concerning terminal ID data allocated to the every portable terminal apparatus 3 and required information beginning with user related data such as bill setting information and the like, which creates a database, other than the above-mentioned plurality of information. Meanwhile, particularly in the embodiment, the distributing information prepared for downloading by the user of the portable terminal apparatus 3 is defined as [Download Information] and is distinguished from [retrieval information] to be mentioned later which a user uses to retrieve the above-mentioned download information.

Here, as for the memorizing medium in the memorizing unit 102, a magnetic tape and the like used in the present broadcasting equipment may be conceivable, but in order to realize the on demand function which is one of the characteristics of the system, it is recommendable to use a hard disk capable of random access, a semiconductor memory, an optical disk, a magneto-optical disk and the like.

Also, it is desirable that data memorized in the memorizing unit 102 is digital-compressioned in order to memorize a large amount of a plurality of data. As compression methods, for example, a variety of methods such as a modified DCT (Modified Discreat Cosine Transform), Twin VQ (Transform domain Weighted Interleave Vector Quantization) and the like (trade marks) which are disclosed in a Japanese laid-open patent publication 3-139923, a Japanese laid-open patent publication 3-139922 and the like are conceivable, but there are not particular limitations as long as the compression methods are capable of being expanded on, for example, an intermediate transmitting apparatus 2 side.

The check processing unit 104 checks terminal ID data of the portable terminal apparatus transmitted together with, for example, the demand information and the like with a data base (memorized in, for example, the memorizing unit 102 as user related data) of the terminal ID data of the portable terminal apparatus which is at present capable of using the information distribution system of the embodiment and outputs the checked result to the control unit 101. For example, the control unit 101, based on the checked result which is supplied thereto, decides on permission for or non-permission against the use of the information distribution system on the part of the portable terminal apparatus 3 connected to the intermediate transmitting apparatus 2 to which the demand information is transmitted.

Also, the billing processing unit 105 carries out a process under the control of the control unit 101 for billing the amount of money corresponding to the contents of the use of the information distribution system by the user having the portable terminal apparatus 3. For example, when demand information for memorizing information and charging is supplied to the server apparatus 1 from the intermediate transmitting apparatus 2 through the communication network 4, the control unit 101 transmits data for transmitting information corresponding to the demand information and for permitting the charge as well as carries out control so that the billing of an amount of money corresponding to the practical contents of the use is carried out by the billing processing unit 105 according to a predetermined rule after grasping practical states of the use by the intermediate transmitting apparatus 2 and the portable terminal apparatus 3 based on the transmitted demand information.

Next, the intermediate transmitting apparatus 2 will be explained.

The intermediate transmitting apparatus 2 as shown in FIG. 3 is provided with a displaying unit 202, a key manipulating unit 203, a control unit 207, a memorizing unit 208, an interface unit 209, a power supplying unit (a charging circuit is included) 210 and a fitting judging unit 211 and these units are respectively connected by a bus line B2.

The control unit 207 is formed of a microcomputer and the like and depending on necessity, controls operations of respective function circuits within the intermediated transmitting apparatus.

In this case, the interface unit 209 is provided between a communication control terminal 201 and the information input/output terminal 205 and can carry out interactive communication with the server 1 through the communication network 4 as well as interactive communication with the portable terminal apparatus 3. That is, with the interface 209 as an intermediary, an environment is arranged in which communication between the server apparatus 1 and the portable terminal apparatus 3 is carried out.

The memorizing unit 208 is formed of, for example, a memory, a predetermined kind of recording medium and driving devices thereof and temporarily memorizes information transmitted from the server apparatus 1 or the portable terminal apparatus 3. Writing-in and reading-out control of information in and from the memorizing unit 208 is carried out by the control unit 207.

Also, in the memorizing unit 208 of the embodiment are, as will be mentioned later, provided a retrieval information memorizing area 208a for memorizing retrieval information used by the user for retrieving the required information and a memorizing area 208b in which table information indicating a correspondence between the retrieval information and the download information.

The retrieval information is supposed to be information related to, for example, the download information and includes secondary information concerning, for example, an advertisement, movies and a broadcast in which the downloaded information to be mentioned later is used, other than titles of the information and the like and more than one kind of the retrieval information is prepared at every download information. Also, in the embodiment, as the secondary information included in the retrieval information, information having some advertising elements is included. Concretely, a certain piece of music is run in a television commercial as, for example, the download information, the video information of the commercial is included in the retrieval information as the information having advertising elements. Alternately, when a piece of music as the download information is made inserted music in movies, a television drama and the like, information on the advertised images of the movies and the drama and the like are included in the retrieval information as information having the advertising elements.

It is recommended that the retrieval information is offered or transmitted to the server apparatus 1 from, for example, an advertising corporation or the like, and after once memorizing the transmitted retrieval information in the internal memorizing unit 102, the server apparatus 1 uploads the retrieval information in the intermediate transmitting apparatus 2 at a certain opportunity so that the information is memorized by the intermediate transmitting apparatus 2.

The power supplying unit 210 is formed of, for example, a switching converter and the like and generates a DC voltage with a predetermined voltage from a commercial alternating current power source not graphically shown and supplies it to respective units in the intermediate transmitting apparatus 2 as an operating power source. Also, the power supplying unit 210 is provided with a charge circuit for charging a secondary battery of the portable terminal apparatus 3. The power source supplying terminal 206 supplies charge power from the charge circuit to the secondary battery of the portable terminal apparatus 3 through the power source input terminal 307 of the portable terminal apparatus 3.

The fitting judging unit 211 judges whether or not the portable terminal apparatus 3 is in a state of being fitted to the terminal fitting unit 204 of the intermediate transmitting apparatus 2. The fitting judging unit 211 may be formed of, for example, mechanisms such as a photo-interrupter, a mechanical switch and the like or may detect a conduction state of predetermined terminals, which are obtained by connecting the terminals 205 and 206 with the terminals 306 and 307 after the portable terminal apparatus 3 is correctly fit to the intermediate transmitting apparatus 2 by using, for example, the power source supplying terminal 206, the information input/ output terminal 205 and the like.

The displaying unit 202 is, as previously shown in FIG. 1 and FIG. 2, provided so that it faces the main body of the intermediate transmitting apparatus 2 and is formed of displaying devices such as, for example, a liquid crystal display, a CRT (Cathode Ray Tube) and the like, their driving circuits and the like. In the embodiment, if the retrieval information selected according to retrieving operations by the user at a time of retrieving the download information is image information, which will be explained later, image information as the retrieval information is displayed on the displaying unit 202. The displaying operation by the displaying unit 202 is controlled by the control unit 207.

The key manipulating unit 203 is provided with, for example, as shown in FIG. 2, various kinds of keys and manipulating input information carried out by the user using the key manipulating unit 203 is supplied to the control unit 207 through the bus line B2. The control unit 207 carries out a control process according to the supplied manipulating input information.

Next, the portable terminal apparatus 3 will be explained.

The portable terminal apparatus 3 shown in FIG. 3 is, by being fit to the intermediate transmitting apparatus 2 as explained in FIG. 2, connected to the intermediate transmitting apparatus 2 in a way that the data communication between the intermediate transmitting apparatus 2 and the portable terminal apparatus 3 is possible through the information input/output terminal 205 and the information input/ out terminal 306, and is supplied with electric power from the power source supplying unit 210 of the intermediate transmitting apparatus 2 through the power source supplying terminal 206 and the power source input terminal 307.

The portable terminal apparatus 3 shown in the figure is provided with a control unit 311, a ROM 312, a RAM 313, a signal processing unit 314, I/O ports 317, 319, a voice recognizing unit 321, a voice synthesizing unit 322, a key manipulating unit 301 and key manipulating unit 302 and these respective functional circuits units are connected by bus line B3.

In this case, too, the control unit 311 is formed of a microcomputer and the like and controls operations of the respective units in the portable terminal apparatus 3.

Also, in the ROM 312 is memorized program data necessary for, for example, the control unit 311 to carry out a required control process, various kinds of databases and the like. In the RAM 313, is temporarily retained required data for communicating with the intermediate transmitting apparatus 2 and data generated by a process of the control unit 312.

The I/O port 317 is provided for carrying out interactive communication with the intermediate transmitting apparatus 2 through the information input/out terminal 306. The demand information transmitted from the portable terminal apparatus 3 and data downloaded from the server apparatus 1 are outputted and inputted through the I/O port 317.

The memorizing unit 320 provided in the portable terminal apparatus 3 is provided with a driver and the like for carrying out recording or reproducing of information in and from a recording medium, and the information downloaded from the server apparatus 1 through the intermediate transmitting apparatus 2 is memorized therein.

Meanwhile, the recording medium used in the memorizing unit 320 is not particularly limited, but in this case, too, when random accessibility is taken into consideration, the adoption of recording medium capable of random access such as a hard disk, an optical disk, a semiconductor memory and the like is recommended.

In the embodiment, of the information memorized (the download information is included) in the memorizing unit 320, audio data is supposed to be capable of being reproduced and outputted by the portable terminal apparatus 3. To this end, the signal processing circuit 314 is provided in the portable terminal apparatus 3.

The signal processing circuit 314 is supplied with, for example, audio data read out from the memorizing unit 320 through the bus line B3 and carries out a required signal process for the supplied audio data. Here, a predetermined encoding beginning with compression process according to a predetermined form has been carried out to the audio data memorized in the memorizing unit 320, the signal processing unit 314 carries out an expanding process as well as a predetermined decoding process for the inputted compressed audio data, and outputs the same to a D/A converter 315. A digital signal outputted from the signal processing unit 314 is converted to an analog audio signal in the D/A converter 315 which is then supplied to an audio output terminal 309. Meanwhile, in FIG. 3, a state is shown in which a headphone 8 is connected to the audio output terminal 309 of the portable terminal apparatus 3.

Also, the portable terminal apparatus 3 is provided with a microphone terminal 310. When voice is inputted by connecting a microphone 12 to, for example, the microphone terminal 310, an analog audio signal outputted from the microphone 12 through the microphone terminal 310 is converted to a digital audio signal by an A/D converter 316 which is then supplied to the signal processing circuit 314.

In this case, the signal processing circuit 314 carries out, for example, a compressing process as well as a required encoding process for the digital audio signal supplied from the A/D converter 316 appropriate for writing data in the memorizing unit 320. The data subjected to the encoding process by the signal processing unit 314 can be memorized in the memorizing unit 320 under, for example, the control of the control unit 311 or can be outputted as it is to the audio output terminal 309 from a voice output system of the signal processing circuit 314 through the D/C converter 315 without being subjected to the above-mentioned signal process by the signal processing circuit 314.

The I/O port 318 is provided capable of carrying out an input and output with an equipment and an apparatus connected to the outside by using the connector 308. For example, an outside monitor apparatus, a key board, a modem, or a terminal adaptor and the like can be connected to the connector 308. Regarding this, explanations will be given later as examples of usage forms of the portable terminal apparatus 3.

Also, a battery circuit 318 provided in the portable terminal apparatus 3 is provided with at least a secondary battery as well as a power source circuit made to supply an operational power source for the respective units of the portable terminal apparatus 3 by using electric power of this secondary battery. In a state in which the portable terminal apparatus 3 is fit to the intermediate transmitting apparatus 2, an operating power source of the respective units of the portable terminal apparatus 3 and charge electric power of the secondary battery are supplied to the battery circuit unit 319 from the power supplying unit 210 through the power source supplying terminal 206 and the power source input terminal 307.

The displaying unit 301 and the key manipulating unit 302 of the portable terminal apparatus 3 shown in the figure are provided, for example, as shown in FIG. 2, in the main body of the portable terminal apparatus 3 and in the portable terminal apparatus 3, too, displaying control of the displaying unit 301 is carried out by the control unit 207. In this case, the image information memorized in the memorizing unit 320 by the download operation as mentioned before can be displayed on the displaying unit 301. Also, the control unit 207 carries out a required control process based on manipulating input information inputted by using the key manipulating unit 302 properly.

[2. Downloading of information in the embodiment]

(2-a. the data structure of each information)

Next, downloading of information to the portable terminal apparatus 3 in the information distribution system concerning the embodiment will be explained. Meanwhile, hereafter, explanations will be given on condition that the download information is a piece of music information for convenience's sake.

In the embodiment, when the user of the portable terminal apparatus 3 downloads a piece of music information, it is possible to designate a required piece of music information by directly inputting the name of the piece of music and the like, but retrieval can be carried out even the user does not accurately know, for example, the name of the piece of music by using the above-mentioned retrieval information. In a case where the selected retrieval information has information which includes advertising elements, by having the information having the advertising elements in the retrieval information displayed on the displaying unit of the intermediate transmitting apparatus 2 and the like, information is offered to the user as a clue to carrying out the retrieving. Then, an amount of money to be billed, which is reduced by as much as the use of the information having the advertising elements of the retrieval information is worth, is set.

Then, first of all, examples of data structure of the download information and the retrieval information will be explained with reference to FIG. 4 in order to realize the retrieval of the above-mentioned download information.

Figure 4A:
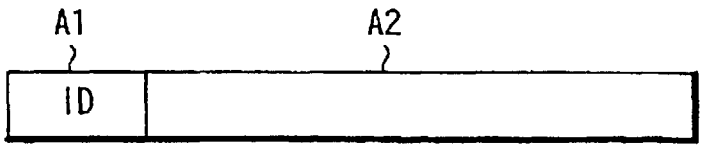
FIG. 4 is an explanatory diagram showing an example of a data structure of download information and retrieval information.

In FIG. 4A, a data structure of the download information memorized in the memorizing unit 102 of the server apparatus 1 is shown. The download information is, as shown in FIG. 4A, for example, formed of a header area A1 and a data area A2 contiguous to the header area A1. In the header area A1 is memorized various kinds of predetermined relevant data necessary for each of the download information. The relevant data includes inherent ID data for at least each of pieces of music data. Also, in the data area A2 is stored pieces of music data (audio data) by a predetermined data format.

In the embodiment, as the kinds of the retrieval information memorized in the memorizing unit 208 of the intermediate transmitting apparatus 2, music's name information, player's name information, movie information, drama information, and commercial information are used. For a piece of music data, according to a source of its music, a part of the retrieval information such as the above-mentioned music's name information and the like or depending on a case, the whole of the retrieval information is prepared.

In FIG. 4B to FIG. 4F, respective data structures of the music's name information, the player's name information, the movie information, the drama information, and the commercial information are shown. Each of the retrieval information shown in these diagram is formed of a header area A1 and a data area A2. In the header area A1 of the retrieval information is memorized inherent ID data for at least every information. Also, depending on necessity, required information (for example, a product's name, a corporation's name and the like in the case of a commercial) concerning every information is memorized.

Figure 4B:
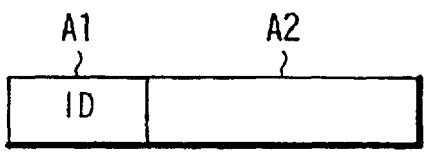
Figure 4C:
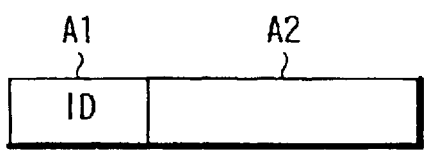
Figure 4D:
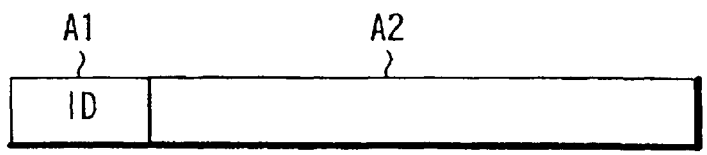
Figure 4E:
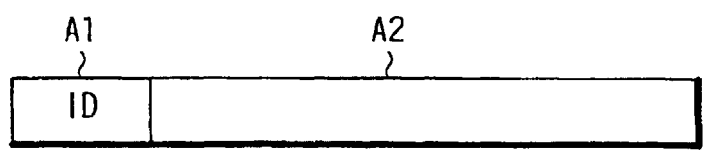
Figure 4F:
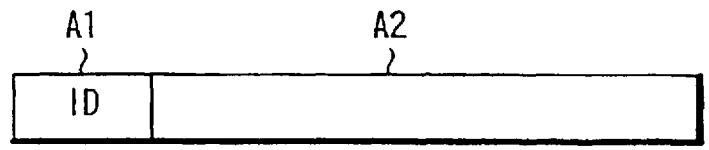

Also, in the data area A2 of the retrieval information as shown in FIG. 4B, music's name data showing the music's name is memorized as, for example, character information, and in the data area A2 of the retrieval information as shown in FIG. 4C is memorized player's name data showing the player's name as character information. And further, in the data areas A2 of the retrieval information as shown in FIGS. 4D to 4F, for example, image data for movie promotion, image data for television drama promotion and image data for a commercial are respectively memorized. Meanwhile, these promotional image data do not particularly preclude any of moving image data as well as still image data.

In the embodiment, of the retrieval information shown in FIG. 4B to FIG. 4F, movie information, drama information and commercial information as shown at least in FIG. 4D to FIG. 4F are information having advertising elements. That is, the retrieval information is offered or transmitted to the information distribution system by a certain advertisement sponsor (corporation) and advertisement rates for the advertising elements included in the retrieval information are paid for by the advertisement sponsor. In the embodiment, at a time of retrieving, when the displaying unit 301 of the portable terminal apparatus 3 is made to display the retrieval information mentioned above, reduction in the rates for the download information is carried out as revenues from the advertisement rates for the advertisement sponsor can compensate for the reduced amount of money. Meanwhile, as for the contents of the retrieval information having the advertising elements, for example, the contents practically used for other mass media and the like may be diverted or the contents specifically arranged to the information distribution system may be used.

For example, in the memorizing area 208*b* in which table information of the memorizing area 208 explained previously with reference to FIG. 3 is memorized, information showing a correspondence between all the ID data of the retrieval information memorized in the same memorizing unit 208 and the ID data of the download information is memorized. For example, when a certain retrieval information is selected as will be mentioned later, the intermediate transmitting apparatus 2 can specify the download information corresponding to the download information by referring to the table information memorized in the memorizing area 208*b*.

(2-b. Selecting manipulation and a processing operation for downloading information)

Next, an operation at the time of downloading a piece of music information concerning the embodiment will be explained with reference to FIG. 5 to FIG. 8.

Figure 6:
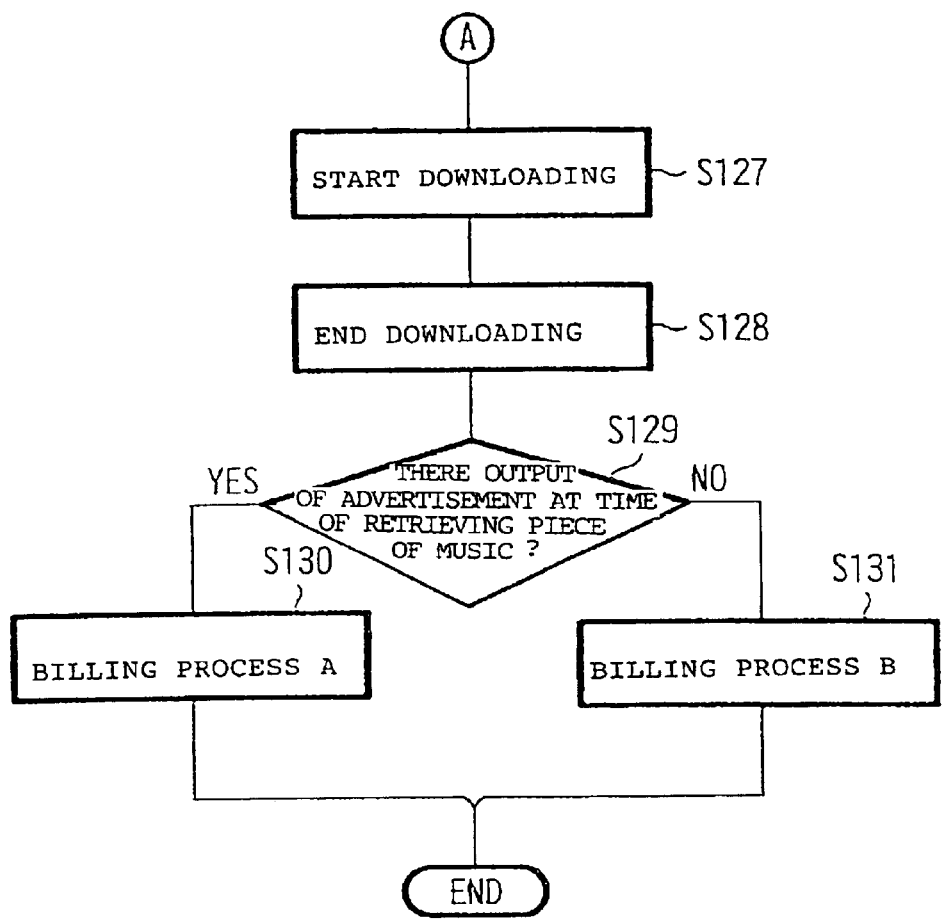
FIG. 6 is a flowchart for realizing operations at a time of downloading information on a piece of music.
Figure 7:
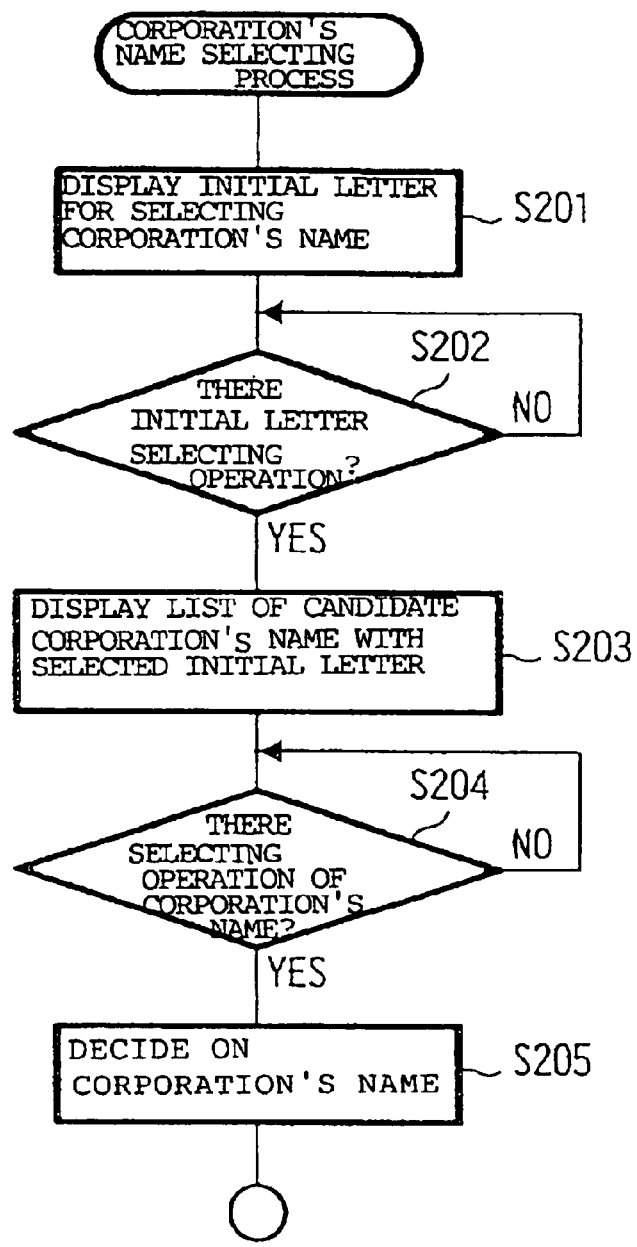
FIG. 7 is a flowchart showing processing operations for selecting a corporation's name at a time of retrieval based on commercial information.

FIG. 5 through FIG. 7 are flowcharts showing processing operations at the time of downloading, which the information distribution system concerning the embodiment should carry out, and which are mainly carried out by the control unit 207 of the intermediate transmitting apparatus 2.

FIG. 8 shows examples of display images which are displayed on the displaying unit 202 for selecting a corporation's name at the time of designating the download information based on commercial information to be explained later.

Meanwhile, key manipulation the user carries out in order to download a piece of music information can be carried out by using the key manipulating unit provided in the portable terminal apparatus 3, but in the following explanation, the key manipulation will be explained as one carried out by the key manipulating unit 203 of the intermediate transmitting apparatus 2.

The user fits the portable terminal apparatus 3 to the terminal fitting unit 204 of the intermediate transmitting apparatus 2 and thereafter, by carrying out a predetermined key manipulation using the key manipulation unit 203 of, for example, the intermediate transmitting apparatus 2, the process is shifted to a mode for selecting the piece of music information. For example, in the embodiment, by carrying out a predetermined manipulation with the use of the key manipulating unit 203, the process proceeds, first of all, to step S101 in FIG. 5 and is made to carry out a process to select a retrieving item.

Here, the "retrieving item" is supposed to be presented as one out of the kinds of the retrieval information explained with reference to FIGS. 4B–F. At step S 101, under control of the control unit 207, by having the displaying unit 202 of the intermediate transmitting apparatus 2 display a menu screen and the like in order to let select uniquely the retrieving item, there comes a state waiting for the user to select one retrieving item by using the key manipulating unit 203.

At step S101, when a commercial (CM) is selected as a retrieving item, the process proceeds to a retrieval selecting mode for a piece of music information based on commercial information after step S102. A case where the commercial information is retrieved and selected as a retrieving item by the user is the case in which the user does not adequately grasp a name of the piece of music, a player's name and the like related to the desired piece of music information or the user does not have correct knowledge of them, but remembers that the piece of music information is used in some commercial.

At step S102, there are displayed an input screen capable of directly inputting a title of a commercial (for example, an accurate name of merchandise and the like) on the displaying unit 202, for example, and a selecting screen for the user without adequate or correct knowledge of the title of the commercial to select a "clue inputting mode" which displays the names of corporations and merchandise of various kinds of commercials as candidates, which will be explained later. That is, at this time point, the user can arbitrarily make a choice of either directly inputting the commercial title or proceeding to a "clue inputting mode".

Then, when the user directly inputs the commercial title according to a predetermined manipulation (for example, an input of characters or the like), the process proceeds to step S106 and when the user selects "the clue retrieving mode", the process proceeds to step S103 and proceeds to "the clue retrieving mode".

At step S103, first of all, a process for selecting a corporation using the commercial as a clue to retrieval is carried out. A process operation as a sub-routine corresponding to the step S103 is shown in FIG. 7.

When the process proceeds to step S103 in FIG. 5, as a process for selecting a corporation's name, a process at step S201 in FIG. 7 is first carried out. At step S201, a selecting image display for selecting a head character of the corporation's name as shown in FIG. 8A is carried out and ensuingly, at step S202, the process waits for the user to carry out a selecting manipulation of the head character by using the manipulating unit 203.

Figure 8A:
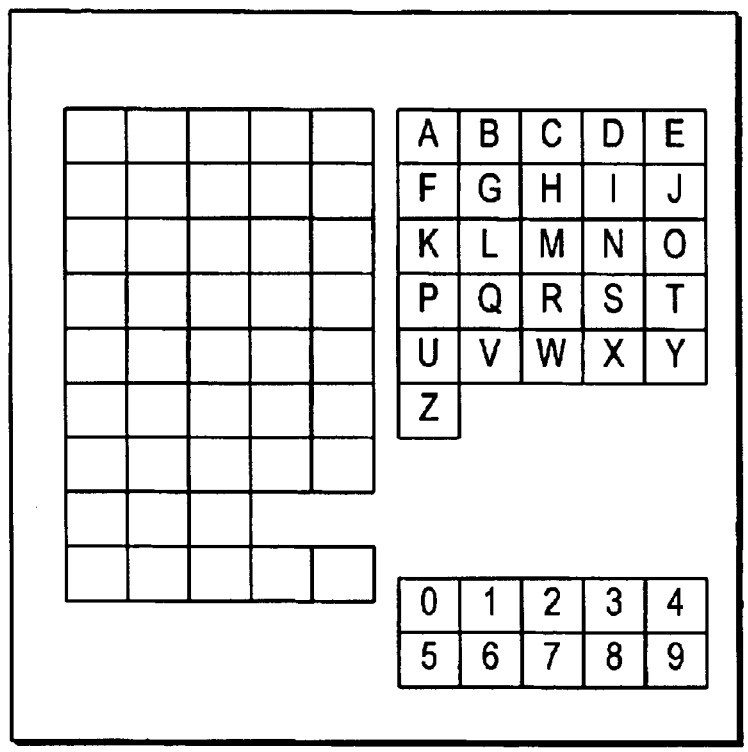
FIG. 8 is an explanatory diagram for showing an example of displaying forms on a displaying unit at a time of selecting the corporation's name.
Figure 8B:
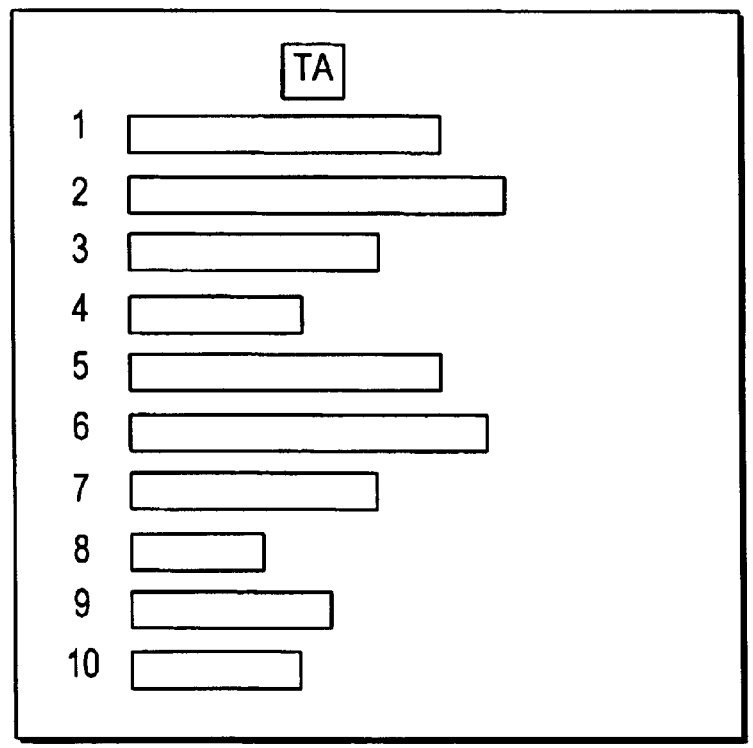

Here, when the user selects the first character of the corporation sponsoring the commercial in which the required piece of music is used by using the key manipulating unit 203 while looking at the selecting image display as shown in FIG. 8A, the control unit 207 of the intermediate transmitting apparatus 2 proceeds to step S203 and displays a list of corporations having the selected first character as shown in FIG. 8B. Candidates for corporation's names are displayed in, for example, a blank rectangle of the drawing in AIUEO order, that is, in order of 50 characters or in alphabetical order according to the numbers of "1" to "10" or according to displaying order by a predetermined rule such as numerical order and the like. The example as shown in FIG. 8B displays a state wherein [TA] of Japanese HIRAGANA characters is selected as the character and for example, in this case, according to numbers of [1] to [10], corporation's names having a head character [TA] are displayed in AIUEO order, that is, in order of 50 characters.

The displaying of the list of such corporation's names can be realized in a way that corporation's names data corresponding to the header area of, for example, each commercial information is memorized beforehand as [a clue retrieving data], and the control unit 207 rearranges the corporation's names data memorized in the header area of the each commercial information which is memorized in the retrieval information storing area 208a in the order of 50 characters to obtain listed information.

Meanwhile, a displaying form of the list display of the corporation's names displayed on the displaying unit 202 is arbitrary, and in a case where all the firm's names can not be displayed at a time because there are too many firm's names having a certain first character, it is recommendable that the display as shown in FIG. 8B is formed in terms of a page unit and the displayed images is page-fed or scrolled according to a predetermined operation. Also, when it is not enough to only specify a head character, the following case is conceivable in which it is conceivable that the second, the third . . . character from the head can be selected so that the more narrowing-down retrieval can be carried out.

At step S204, the process waits for a certain corporation's name to be selected from the list display of the corporation's names shown in FIG. 8B by a predetermined manipulation of the user and at step S204, when it is judged that selecting manipulation of the corporation's names is carried out, the process proceeds to step S205 to decide on a corporation's name specified by the retrieving manipulation at step S204 as a clue element of retrieving the commercial and the process proceeds to step S104 in FIG. 5. Meanwhile, when a manipulation is carried out on the screens shown in FIG. 8A and FIG. 8B, a display panel in the displaying unit 202 of the intermediate transmitting apparatus 2 may be formed of a touch panel, thereby making it possible for the user to carry out a manipulation of directly pointing at the display panel with a finger or the like.

At step S104, the process for selecting a merchandise name is carried out. Meanwhile, a display form of the selecting manipulation by the user, and a selected image at a time of selecting the merchandise name at step S104 may be proportionately applied to FIG. 8A and FIG. 8B. For example, according to manipulating forms at a time when the selecting retrieval of the above-mentioned corporation's names is carried out, specifying of merchandise may be carried out from the kinds (for example, a car, an electric appliance and cosmetics) of common merchandise and ultimately, a merchandise name may be specified. Also, the display of a list of merchandise names can be realized by a process similar to the case explained at step S103, if only merchandise name data is memorized in the header area of each commercial information as [a clue retrieving mode]. After step S104, in a case of deciding on each selecting item which becomes a clue as [a clue retrieving mode], too, the selecting manipulation and the displaying operation of the selected screen may be proportionately applied to FIG. 7, FIG. 8A and FIG. 8B and at the time the display of a list displayed on the display unit 202 may proportionately applied to the above-mentioned control operation.

When a commercial is broadcast, because its contents are periodically changed even when the commercial is about, for example, the same merchandise, a state is conceivable in which the required piece of music by the user has not already been used in the commercial being broadcast at present even if the commercial is specified by narrowing down a corporation's name and a merchandise name by the processes up to step S104. In this case, by preparing commercial information broadcast for the past certain period of time, it is made possible at step S105 to select from the years (broadcast period) in which the commercial was broadcast.

Meanwhile, at step S102, it was so explained that when a commercial title is directly inputted, the process proceeds to step S106, but instead, the process may proceed to step S105, thereby making it possible to select from the broadcasting years (broadcast period) in cases of a direct input of the title, the clue retrieving mode and in whatever cases.

At a point of time when step S105 is ended, a state is in place where the clue elements of [the corporation's name, the merchandise name and the broadcast years (broadcasted period)] are decided on or established. At the following step S106, the control unit 207 carries out a narrowing-down retrieval based on the decided or established [the corporation's name, the merchandise name and the broadcast years (broadcasted period)] at step 105 and decides on a certain commercial information. Also, in a case where the process proceeds from step S102 to step S106, it is time for a decision to be made on the commercial information based on the commercial title inputted at step S102. This commercial information may be decided on by referring to the memorized commercial title coincident with the inputted title at step S102 as commercial title data is beforehand memorized in, for example, the header area A1 of each commercial information.

In this manner, when the commercial information is decided on, at the following step S107, the process has the displaying unit 202 practically display the commercial information decided on at step S106. The process at step S107 reads out the commercial information (image information) decided on at step S106 from the retrieval information storing area 208a of the recording unit 208 and the commercial information as the read-out image information is displayed on the displaying unit 202. Meanwhile, an audio outputting system of the intermediate transmitting apparatus 2 is not graphically shown in FIG. 3, but, as a matter of course, it is desirable that in order to verify the commercial information selected by the user, the piece of music used in the commercial needs to be audio-outputted together with the image information displayed on the displaying unit 202 and hence, audio data on the piece of music is prepared as the commercial information together with the image information so that its audio is outputted.

In this manner, at a time of the piece of music information being retrieved, in a case where the information having the advertising elements is used as the retrieving item like this commercial information, the decided retrieval information is watched as the advertisement. Meanwhile, during the time the retrieving item is being outputted from the intermediate transmitting apparatus 2 as an advertisement, user's manipulation and the like by the key manipulating unit 203 are in principle not received.

When all the contents of the commercial information are outputted at step S107, the outputting process of the commercial information is terminated at step S108 and the process proceeds to step S126.

Also, when a television drama is selected as a retrieving item at step S101, the process proceeds to a selecting mode for a piece of music based on drama information at and after step S109.

At step S109, an input screen for directly inputting a drama's title and a selecting image for selecting [a clue input mode] which carries out a retrieval based on clue items for a retrieval to be explained next are displayed in, for example, the displaying unit 202.

Here, when the user directly inputs the drama's title according to a predetermined manipulation using the key manipulating unit 203, the process proceeds to step S113 and when the user selects [the clue retrieving mode], the process proceeds to step S110 and shifts to [the clue retrieving mode].

At step S110, a screen is displayed as, for example, a first clue retrieving item for selecting a television station broadcasting a drama wherein a required piece of music is used or used as an inserted song. The user manipulates the key manipulating unit 203 according to the screen for carrying out the selecting operation of the broadcasting station, and when a name of the broadcasting station is decided on or established according to this manipulation, the process proceeds to step S111.

At step 111, as a second clue retrieving item, a day of the week the drama is being broadcast is selected and at the following step S112, as a third clue retrieving item, a process for selecting the broadcast time of the drama is carried out. The processes at steps S 111 and 112 have, as similar to step S110, the selected image displayed on the displaying unit 202 in a displaying form applied proportionately to FIG. 7 and FIG. 8, and based on the user's selecting operation, a day of the week for broadcasting the drama and its broadcasting time slot is decided on or established. Graphic showing of the detailed selecting procedure and selected screen is omitted. By deciding on or establishing information on, for example, the television station, the broadcasting day of the week and the broadcasting time slot of drama, a certain drama information is decided on or established by a narrowing-down retrieval at step S113. Also, when the process shifts from step S109 to step S113, the drama information by the drama title inputted at step S109 is decided on or established.

At step S114, the drama information (for example, an audio output about the piece of music inserted in the drama is included) decided on at step S113 is outputted from the intermediate transmitting apparatus 2. As mentioned before, the drama information is image data on the promotion and advertisement of the television drama and accordingly, the images of the promotion and advertisement of the television drama selected by the user are displayed on the displaying unit 202.

Then, after an output of all the image data on the drama information is terminated at step S115, the process proceeds to step S126.

When a movie is selected as a retrieving item at step S101, the process proceeds to step S116 and shifts to a selecting mode for a piece of music based on movie information.

At step S116, as similar to step S102 and step S109 previously explained, on the displaying unit 202 there are displayed an input screen for directly inputting a movie title and a selecting screen for selecting [the clue retrieving mode] for carrying out a retrieval based on a clue item concerning the movie.

Then, when the user directly inputs the movie's title by using the key manipulating unit 203, the process proceeds to step S119, while when the [clue retrieving modes] is selected, the process proceeds to step S117 and shifts to [the clue retrieving mode].

At step S117, as a first clue to the movie wherein the required piece of music is used, a process is carried out for selecting a name of a star appearing in the movie and here, when a name of a certain star is selected by a predetermined manipulation, the process proceeds to step S118.

At step S118, for example, a list of titles of the movies the star has appeared in is outputted and displayed based on the star's name selected and the process waits for one movie title to be selected from the titles displayed as a list by a predetermined manipulation.

Meanwhile, the listed display of the movie titles sorted out by the name of the above-mentioned appearing star is such that information on representative stars' names (for example, arbitrary numbers of more than one star) such as the names of the stars starring in the movie is memorized in the header area A1 of the movie information as the retrieving item shown, for example, in FIG. 4D, and the information in the header area A1 on the stars' names and information corresponding to the movie information as the retrieval information are transferred to and memorized in the intermediate transmitting apparatus 2. Based on the memorized correspondence information, image data showing movies' title of movie information linked with a designated star's name may be generated and displayed on the displaying unit 202.

Then, at step S118, when a movies title is selected by the user using the key manipulating unit 203, the control unit 203 decides on or establish the movie information to be outputted based on the selected movie title.

At step S120, the movie information which is decided on or established is read out from the retrieval information storing area 208a of the memorizing unit 208, and outputted and displayed (and a piece of music to be used is audio-outputted) by the displaying unit 208. As a result, as the information contents, the movie information has, for example, advertising images, advance images and the like concerning the movie of title selected by the user are displayed on the displaying unit 202.

Then, when the display and output of all the contents of the movie information is terminated, at step S121, the display output up to this time is terminated and the process proceeds to step S126.

Meanwhile, when there are prepared other retrieving items which do not have any particular advertising elements, and in a case where these items are selected at step S101, as processes at steps S122 and S123, after a title of a required piece of music is retrieved and decided on based on selected retrieving items, the process is made to proceed to step S126. In this case, the above-mentioned display of advertisements and the like by the retrieval information is not carried out particularly. As a matter of course, it is the same with the case where the user has an accurate knowledge of a music's name and the like at a step S101.

For example, if a case where information on a player's name shown in FIG. 4C is selected as a retrieving item is supposed to be a case where the process shifts to processes at steps S122 and S123, it is recommended that a list of names of pieces of music based on a player's name the user has inputted according to a predetermined manipulation is displayed on the displaying unit 202 and the user may select the required piece of music from the displayed list. However, when the user does not grab an accurate knowledge of the title of the piece of music, it is desirable that a part of the piece of music which has been decided on or established is audio-outputted and the like so that the user can verify the piece of music, for example, as a process at S123.

Meanwhile, the information on players names could be information having advertising elements like the above-mentioned commercial information, the drama information and the movie information. When the players' names information is handled as the information which has advertising elements, as a process following step S123, advertising images, audio and the like are outputted similar to the case of commercial information or the like described before.

Lastly, an input of a name of a piece of music is selected as a retrieving item at step S101, the process proceeds to step S124, where various kinds of controls are carried out for carrying out the selection of a piece of music based on information concerning a music's name inputted by the user while he is using the key manipulating unit 203 and at ensuing step S125, after a piece of music is decided on based on the name of the piece of music inputted by the user's manipulation, the process proceeds to step S126.

At step S126, a process is carried out for verifying the piece of music information selected based on the respective retrieving items which have been explained so far. To this end, for example, the control unit 207 of the intermediate transmitting apparatus 2 has the displaying unit 202 display several predetermined information capable of specifying pieces of music beginning with the title of the selected piece of music as well as has the displaying unit 202 carry out a display urging verifying manipulation. Then, when the manipulation showing that a piece of music selected right now is different from the one the user is demanding is carried out by the user, the process returns to step S101 again and the operation explained heretofore is carried out. On the other hand, when a verifying operation that the piece of music selected at present is the one the user is demanding is carried out, the process proceeds to step S127 shown in FIG. 6.

At step 127, downloading of the established piece of music verified at step S126 is started.

As is understood from the explanations so far, even when the selection of the piece of music is carried out by any one of processing stages of [steps S102 to S108], [S109 to S115], [S116 to 121], [S122 to S123] and [S124 to S125], all these processes are carried out by selecting the retrieval information corresponding to the required piece of music from the retrieval information shown in FIGS. 4B to 4F.

Then, as a process at step S127, first of all, the control unit 207 of the intermediate transmitting apparatus 2 distinguishes the established piece of music, that is, corresponding relations between ID data memorized in the header area of the retrieval information whose selection is established and ID data on the piece of music information (information which becomes a target of downloading) corresponding to the selected retrieval information by referring to table information memorized in the memorizing area 208b. Then, the ID data on the piece of music information obtained by the distinguishing process is transmitted to the server apparatus 1 as demand information indicating the piece of music which has to be downloaded.

Also, at a time when the demand information is transmitted to the server apparatus 1, terminal ID data memorized in the portable terminal apparatus 3 together with the demand information is read out from, for example, the ROM 312 of the portable terminal apparatus 3 and transmitted to the server apparatus.

When it is verified that transmission of data including the demand information and the terminal ID data from the intermediate transmitting apparatus 2 side are terminated, the first of all, the server apparatus 1 carries out a check of the terminal ID data transmitted together with the demand information in the check processing unit 104.

When it is judged that the terminal ID data is capable of using the information distribution system as a result of checking, a retrieval of the piece of music information corresponding to or coinciding with the transmitted demand information is started out of the information memorized in the memorizing unit 102.

This retrieving process is carried out by the control unit 101 controlling the retrieving unit 103, for example, by checking ID data as the demand information with ID data (for example, memorized in the header area A1 as shown in FIG. 4A) attached to each piece of music information memorized in the memorizing unit 102. In this manner, the piece of music information corresponding to or coinciding with the demand information is retrieved and the piece of music information the server 1 has to distribute is decided on.

Meanwhile, at a time of the checking process of the above-mentioned terminal ID data, when a result of judgement is obtained that the transmitted terminal ID data can not use the information distribution system at present because the terminal ID data has yet to be registered, the remaining money is not enough and the like, error information indicating the contents may be transmitted to the intermediate transmitting apparatus 2. As a result, it is recommended that a warning based on the transmitted error information is displayed on the displaying unit 202 of the intermediate transmitting apparatus 2 or the displaying unit 301 of the portable terminal apparatus 3 or a warning sound based on the transmitted error information is outputted by further providing an audio outputting unit such as a speaker and the like in the intermediate transmitting apparatus 2.

The server apparatus 1, as mentioned above, transmits the piece of music information retrieved from the memorizing unit 102 in response to the demand information to the intermediate transmitting apparatus 2 as mentioned above. The information received by the intermediate transmitting apparatus 2 is memorized, that is, downloaded in the memorizing unit 320 of the portable terminal apparatus 3 which is fit to the intermediate transmitting apparatus 2 through the information input/output terminal 205 and the information input/output terminal 306.

For example, as mentioned above, when all the piece of music information is downloaded to the portable terminal apparatus 3, a process for terminating the download operation up to now is carried out at step S128. Here, a message or the like informing that the termination of the information downloading is completed is displayed on, for example, the displaying unit 301 of the portable terminal apparatus 3 or the displaying unit 202 of the intermediate transmitting apparatus 2.

A following process of shifting to step S129 is carried out in, for example, the control unit 101 of the server apparatus 1.

At step S129, as a history when the downloaded piece of music is retrieved, it is judged whether or not an advertising (promotion) display of the selected retrieval information is carried out. According to the explanations up to now, if any of the processing stages of [step S102 to S108], [S109 to S115], and [S116 to S121] was gone through, it means that a display or an audio output has been carried out based on the information having advertising elements included in the selected retrieval information and the process proceeds to step S130.

On the other hand, if any one processing stage out of [S122 to S123] and [S124 to S125] was gone through, as a display or the like based on the information having the advertising elements included in the selected information has been not carried out, the process proceeds to step S131.

Meanwhile, history information showing whether or not the display and the like are carried out based on the information having the advertising elements included in the selected retrieval information at the time of retrieving the above-mentioned piece of music information is transmitted from the intermediate transmitting apparatus 2 to the server apparatus 1 at a predetermined timing such as when the demand information is transmitted, the downloading manipulation is carried out by a user side and the like.

At step S130, with a billing process as being a billing process A in a case where the display and the like of the selected retrieval information have been carried out based on the information having the advertising elements, the billing processing unit 105 generates billing data on the amount of money as billing rates by subtracting the amount of money the practically carried-out advertising display is worth from the downloading rates for the piece of music.

Also, at step S131, with a billing process as being a billing process B in a case where the display and the like of the selected retrieval information are not carried out based on the information having advertising elements, the billing processing unit 105 generates billing data on the rates as it is the downloading of the piece of music is worth as a billed amount of money.

Meanwhile, the manipulation procedures and processing operations up to the downloading by selecting the piece of music which have been explained so far are strictly one example and may appropriately changed if it is possible for the user of the portable terminal apparatus 3 as well as the manager of the information distribution system to obtain a more rational system. For example, when a display of the selected retrieval information is started based on the information having the advertising elements and then, the retrieval information the user selects on the spot turns out not to correspond to the required piece of music, as it is rational to think of a possibility in canceling the display instantly and trying the retrieving again, it is conceivable that the canceling manipulation can be carried out in the midst of the user carrying out the display manipulation based on the information having the advertising elements included in the retrieval information and for example, the display concerning the information having the advertising elements at this time is not made a money-subtracted target at the time of the billing process.

(2-c. Examples of usage forms of the download information)

As explained up to now, after the required information is downloaded to the portable terminal apparatus 3 and the portable terminal apparatus 3 is disconnected from the intermediate transmitting apparatus 2, the portable terminal apparatus 3 becomes a reproducing unit for reproducing the information memorized in the memorizing unit 305.

That is, as long as the user has the portable terminal apparatus 3 to himself, he can reproduce the information memorized in the portable terminal apparatus 3 and display the same on the displaying unit 301 or output the same audio regardless of particular places and time so that he can listen to the information. At this juncture, the user can arbitrarily manipulate a change-over of the reproducing operations of the information by the operating key 305 provided in the portable terminal apparatus 3. This operating key 305 is provided with, for example, fast forward, reproduction, rewinding, stop and pause keys.

Figure 9:
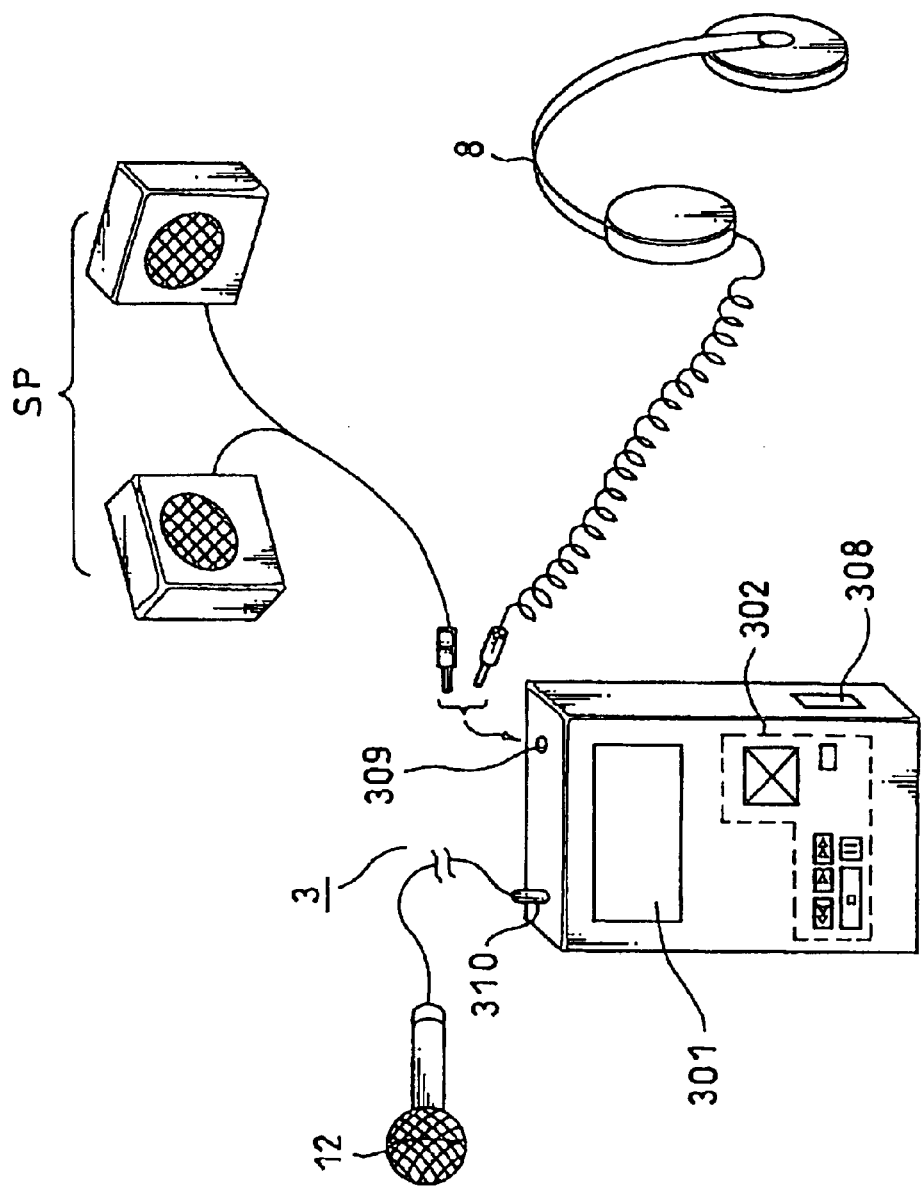
FIG. 9 is a perspective view showing an example of usage forms of the portable terminal apparatus.

For example, when the user wants to reproduce and listen to audio data as the information memorized in the memorizing unit 306, by connecting a headphone 8 or a speaker apparatus SP and the like to the audio output terminal 308 of the portable terminal apparatus 3 as shown in FIG. 9, the reproduced audio data can be converted to a viewer and listened to.

Also, as is similarly shown in FIG. 9, by connecting a microphone 12 to the microphone terminal 309, an analog audio signal based on inputted audio outputted from the microphone 12 is converted to digital data through the A/D converter 316 and the signal processing circuit 314 and memorized in the memorizing unit 320. That is, the audio inputted by the microphone can be recorded. In this case, as the above-mentioned operating key 305, a recording key and the like are further provided.

Further, when karaoke data is being reproduction-outputted as audio data from the portable terminal apparatus 3, for example, the user can sing a song to the tune of the karaoke data reproduced by using the microphone 12 connected to the microphone terminal 309 or the like.

Figure 10:
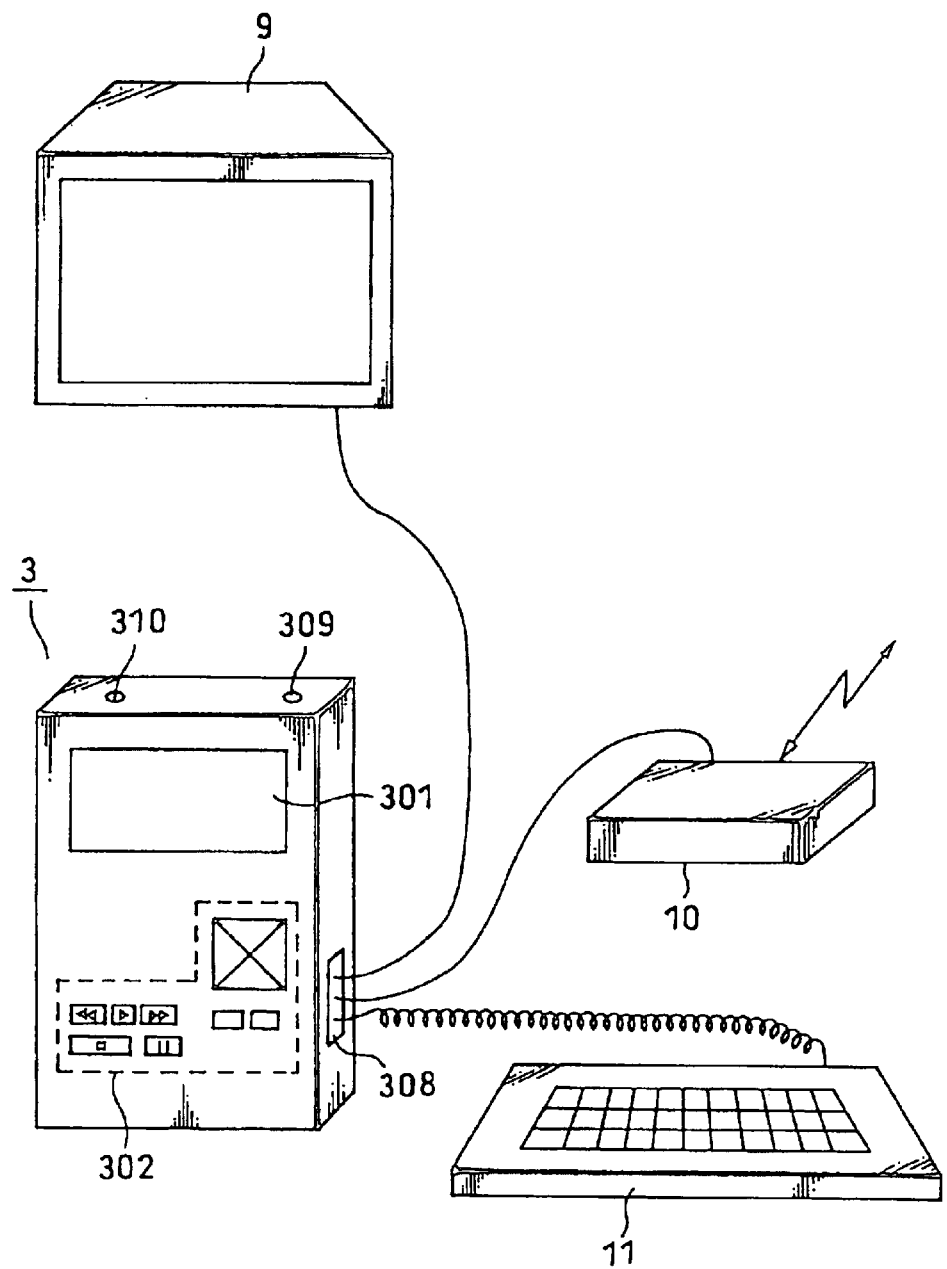
FIG. 10 is a perspective view showing an example of usage forms of the portable terminal apparatus.

Also, to the connector 308 provided in the main body of the portable terminal apparatus 3 concerning the embodiment, there can be connected an outside monitor apparatus 9, a modem 10 (or a terminal adaptor), and a key board 11, as shown in FIG. 10.

For example, image data and the like downloaded by the displaying unit 301 of the portable terminal apparatus 3 itself can be outputted for a display, but, by connecting the outside monitor apparatus 9 to the connector 308 and outputting image data to the outside monitor apparatus 9 from the portable terminal apparatus 3, images can be seen on a larger screen. Also, by connecting a key board 22 to the connector 308 so that an input of characters and the like are made possible, it makes it not only easier to select demanded information, that is, to input the demand information for selecting the information to be downloaded from the server apparatus 1 but also to input more complex command.

Also, by connecting the modem (terminal adaptor) 10 to the connector 308, it is possible to transmit data to and receive the same from the server apparatus 1 without using the intermediate transmitting apparatus 2. Also, depending on a program and the like held in the ROM 312 of the portable terminal apparatus 3, communication with other computers or portable terminal apparatuses through the communication network 4 can be set as well as exchanges of data and the like between users can be made to easily carry out. In stead of the connecting method using the connector 308, if a radio connecting controller is used, it makes it easier to connect by radio, for example, the intermediate transmitting apparatus 2 with the portable terminal apparatus 3.

Meanwhile, in the information distribution system concerning the embodiment explained up to now, the retrieval information including the information having the advertising elements is supposed to be outputted only for the display (audio) but, for example, when there is a demand from the user by resorting to the predetermined manipulation, the information as an advertisement can be downloaded to the portable terminal apparatus 3, too. Further, when the retrieval information including the information having the advertising elements is, for example, image information, the following is conceivable that a printer is made to output a still image obtained from the image information in a state of being processed to a seal and the like, thereby making effective use of the information distribution system.

Also, as a matter of course, the retrieval items are not limited to the items explained in the above-mentioned embodiment and it doesn't matter if various kinds of retrieval items of other kinds are prepared.

Further, in the above-mentioned embodiment, explanations have been made by citing cases where the retrieval information is memorized in the intermediate transmitting apparatus 2, but, for example, taking into consideration the burden of memory capacity in the intermediate transmitting apparatus 2, it is recommended that by having the memorizing unit 102 of the server apparatus 1 memorize the retrieval information, necessary retrieval information is read out from the memorizing unit 102 and transmitted to the intermediate transmitting apparatus 2 in response to the demand information which is successively transmitted from the intermediate transmitting apparatus 2 side according to selecting manipulation of the user.

Also, explanations up to now have been made about the case where the piece of music information is mainly the download information, but in accordance with the explanations, it is, as a matter of course, possible to carry out the selection while using the retrieval information on other kinds of download information such as the image information and the like other than the piece of music information, and in this case, too, when an output such as the display and the like based on information having the advertising elements is carried out, a billing process in discounting what the displaying operation and the like are worth may be carried out.

What is claimed is:

1. An information processing apparatus comprising:
    an information storage unit for storing a plurality of information attached with respective information identifying data;
    a retrieval information storage unit for storing a plurality of retrieval information attached with respective retrieval identifying data as well as correspondence information indicating that said retrieval identifying data and said information identifying data correspond to each other;
    a manipulating unit for manipulation by a user;
    a control unit for selecting retrieval information corresponding to an input from said manipulating unit from a plurality of retrieval information read out from said retrieval information storage unit as well as for reading out said information identifying data which corresponds to any one of the input from said manipulating unit and said retrieval information selected by said control unit based on the correspondence information stored in said retrieval information storage unit;
    a retrieving unit for retrieving and outputting information corresponding to the information identifying data read out by said control unit from the plurality of information stored in said information storage unit based on the information identifying data read out by said control unit; and
    a bill processing unit for carrying out a billing process based on history information showing one of whether said information identifying data is read out by said control unit by using retrieval information stored in said retrieval information storage unit and whether said information identifying data is read out based on an input from said manipulating unit.

2. The information processing apparatus as claimed in claim 1, wherein secondary information related to the plurality of information stored in said information storage unit is stored as retrieval information in said retrieval information storage unit.

3. The information processing apparatus as claimed in claim 2, further comprising:
    a displaying unit controlled by said control unit wherein said control unit controls said displaying unit to display a display for selecting selected retrieval information from said plurality of retrieval information based on the secondary information read out from said retrieval information storage unit.

4. The information processing apparatus as claimed in claim 3, wherein said control unit controls said displaying unit to display a selecting screen for the user for selecting said selected retrieval information from said read out plurality of retrieval information based on said secondary information in response to the user using said manipulating unit.

5. The information processing apparatus as claimed in claim 4, wherein said control unit reproduces said secondary information of said selected retrieval information.

6. The information processing apparatus as claimed in claim 5, wherein said secondary information includes information related to an advertisement, a movie and a broadcast in which information stored in said information storage unit is used.

7. The information processing apparatus as claimed in claim 1, wherein said bill processing unit carries out different billing processes based on history information supplied from said control unit when information identifying data is read out from said control unit by using retrieval information stored in said retrieval information storage unit and when said information identifying data is read out based on an input from said manipulating unit.

8. The information processing apparatus as claimed in claim 7, wherein said bill processing unit carries out a billing reducing process when said history information shows a case where information identifying data is read out by using retrieval information stored in said retrieval information storage unit.

9. The information processing apparatus as claimed in claim 1, further comprising:
    a storage unit for storing information corresponding to information identifying data which is read out by said control unit and outputted from said retrieving unit.

10. The information processing apparatus as claimed in claim 9, further comprising:
    a main body unit in which said manipulating unit, said retrieval information storage unit, and said control unit are provided; and
    a terminal unit having said storage unit removably provided in said main body.

11. An information processing method comprising the steps of:
    selecting retrieval information corresponding to an input from a manipulating unit from a plurality of retrieval information read out from a retrieval information storage unit;
    reading out information identifying data corresponding to any one of an input from said manipulation unit and said retrieval information selected based on correspondence information indicating that retrieval identifying data attached to said retrieval information stored in said retrieval information storage unit and information identifying data attached to a plurality of information stored in the information storage unit, correspond to each other;

retrieving and outputting information corresponding to said information identifying data from a plurality of information stored in said information storage unit; and carrying out a billing process based on history information showing one of whether said information identifying data is read out by using retrieval information stored in said retrieval information storage unit and whether said information identifying data is read out based on an input from said manipulating unit.

12. The information processing method as claimed in claim 11, wherein said retrieval information is secondary information related to a plurality of information stored in said information storage unit.

13. The information processing method as claimed in claim 12, wherein a display is provided for selecting selected retrieval information from said plurality of retrieving information based on secondary information read out from said retrieval information memorizing unit.

14. The information processing method as claimed in claim 13, wherein a selecting screen for selecting said selected retrieval information from said plurality of retrieval information read out based on said secondary information by the user using said manipulating unit is displayed.

15. The information processing method as claimed in claim 12, wherein said secondary information of said selected retrieval information is reproduced to verify said selected retrieval information.

16. The information processing method as claimed in claim 15, wherein after said selected retrieval information is verified, said information identifying data corresponding to said selected retrieval information is read out and outputted.

17. The information processing method as claimed in claim 15, wherein said secondary information is information related to an advertisement, a movie and a broadcast in which information stored in said information storage unit is used.

18. The information processing method as claimed in claim 11, wherein different billing processes are carried out based on said history information when information identifying data is read out using retrieval information stored in said retrieval information storage unit, and when said information identifying data is read out based on an input from said manipulating unit.

19. The information processing method as claimed in claim 18, wherein said billing process is a billing reduction process when information identifying data is read out by using retrieval information stored in said retrieval information storage unit.

20. An information processing apparatus, comprising:

an information storage unit in which a plurality of information associated with information identifying data including at least audio data is stored;

a retrieval information storage unit for storing a plurality of retrieval information associated with retrieval identifying data and correspondence information indicating that said retrieval identifying data and said information identifying data correspond to each other;

a manipulating unit for manipulation by a user;

a control unit for selecting retrieval information corresponding to an input from said manipulating unit from among a plurality of retrieval information read out from said retrieval information storage unit as well as reading out said information identifying data corresponding to any one of an input from said manipulating unit and said selected retrieval information based on correspondence information stored in said retrieval information storage unit;

a retrieving unit for retrieving and outputting information corresponding to information identifying data read out by said control unit from among a plurality of information stored in said information storage unit based on information identifying data read out by said control unit; and a billing processing unit for carrying out a billing process based on history information showing one of whether said information identifying data is read out by said control unit by using retrieval information stored in said retrieval information storage unit and whether said information identifying data is read out based on an input from said manipulating unit.

21. The information processing apparatus as claimed in claim 20, wherein secondary information related to an advertisement, a movie and a broadcast, in which information stored in said information storage unit is used is stored in said retrieval information storage unit as retrieval information.

22. The information processing apparatus as claimed in claim 21, further comprising:

a displaying unit controlled by said control unit wherein said control unit controls said displaying unit to provide a display for selecting selected secondary information from said plurality of secondary information.

23. The information processing apparatus as claimed in claim 22, wherein said control unit controls said displaying unit to display a selection screen for selecting selected retrieval information from said plurality of retrieval information read out based on said selected secondary information provided by the user manipulating said manipulating unit.

24. The information processing apparatus as claimed in claim 23, wherein said control unit reproduces said secondary information of said selected retrieval information.

25. The information processing apparatus as claimed in claim 20, wherein said billing processing unit carries out different billing processes based on history information supplied from said control unit when said information identifying data is read out from said control unit by using retrieval information stored in said retrieval information storage unit, and when said information identifying data is read out based on an input from said manipulating unit.

26. The information processing apparatus as claimed in claim 25, wherein said billing processing unit carries out a billing reduction process when said history information shows a case where information identifying data is read out by using retrieval information stored in said retrieval information storage unit.

27. The information processing apparatus as claimed in claim 20, further comprising:

a storage unit for storing information corresponding to information identifying data read out by said control units as well as outputted from said retrieving unit;

a main body unit in which said manipulating unit, said retrieval information storage unit, and said control unit are provided; and a terminal unit having said storage unit removably provided in said main body.

* * * * *